United States Patent [19]
Melling et al.

[11] 3,776,709
[45] Dec. 4, 1973

[54] METHOD OF TOUGHENING GLASS SHEETS

[75] Inventors: Richard Melling, Hollywood, near Birmingham; John Pickard, Studley, both of England

[73] Assignee: Triplex Safety Glass Company Limited, Piccadilly, London, England

[22] Filed: July 23, 1971

[21] Appl. No.: 165,052

[30] Foreign Application Priority Data
July 29, 1970 Great Britain.................. 36,749/70

[52] U.S. Cl..................................... 65/114, 65/104
[51] Int. Cl............................................. C03b 27/00
[58] Field of Search............................ 65/104, 114

[56] References Cited
UNITED STATES PATENTS
3,293,015  12/1966  Fredley et al..................... 65/104 X

*Primary Examiner*—Arthur D. Kellogg
*Attorney*—Snyder, Brown & Ramik

[57] ABSTRACT

A glass sheet of thickness in the range 1.8 mm to 4 mm having a dual fracture characteristic is toughened by heating the sheet to a temperature near its softening point, exposing the surface of the hot glass sheet to gaseous chilling medium and maintaining a rate of flow of the gaseous chilling medium dependent on the glass thickness, the rate being just sufficient to give a selected heat transfer coefficient with respect to the glass in the range bounded by from 0.008 to 0.02 calories.cm$^{-2}$.°C$^{-1}$.sec$^{-1}$ for 1.8 mm glass and from 0.006 to 0.009 calories.cm$^{-2}$.°C$^{-1}$.sec$^{-1}$ for 4 mm glass. The central tensile stress thereby induced in the glass is from 260 kg/cm$^2$ to 470 kg/cm$^2$ for 1.8 mm glass reducing to from 210 kg/cm$^2$ to 330 kg/cm$^2$ for 4 mm glass.

14 Claims, 1 Drawing Figure

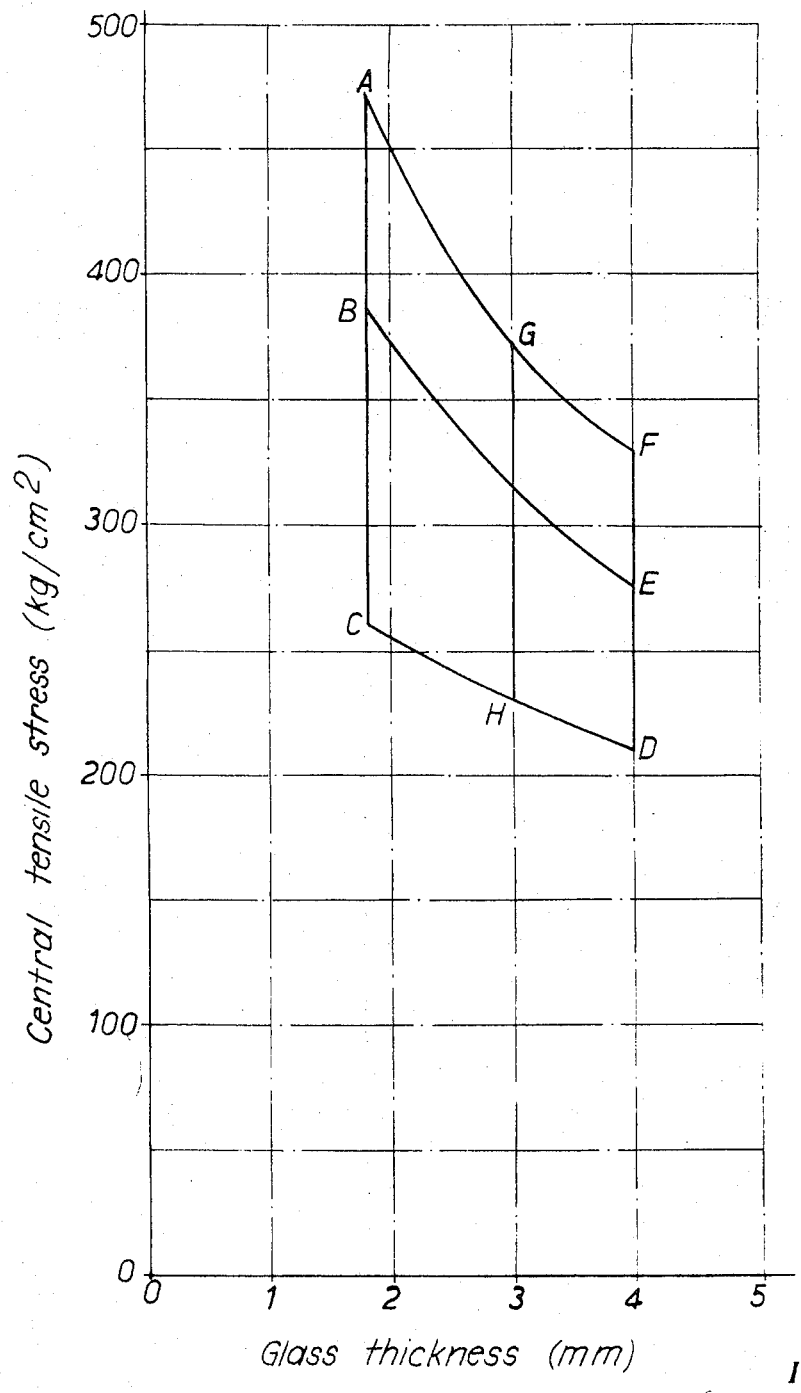

3,776,709

METHOD OF TOUGHENING GLASS SHEETS

BACKGROUND OF THE INVENTION

1. Field of the Invention

This invention relates to the toughening of glass sheets and more especially to a method of toughening thin glass sheets employing a gaseous chilling medium and toughened sheets of thin glass sheets so produced.

The invention also relates to laminated glass units, for example vehicle windscreens, comprising one or more thin sheets of toughened glass.

2. Prior Art

It is known to employ as a vehicle windscreen a single sheet of glass which has been toughened to such a degree that the glass shatters into small fragments when struck by a sharp object, for example a flying stone, or when struck from the inside of the vehicle by the head of the occupant. With such a windscreen, when a vehicle is involved in an accident, the risk of severe laceration of the occupant is low. A vision zone is often provided by differentially toughening the glass sheet in such a way that the vision zone shatters into larger fragments when the windscreen fractures. These larger particles are more liable to cause injury to an occupant of the vehicle.

Laminated glass windscreens are also well known and it has been proposed to use a sheet of toughened glass as the inner sheet of a laminated windscreen. This provides strength and flexibility to help retain the occupant in the vehicle in the event of an accident, but has the disadvantage that a strong inner sheet of the laminate when struck by the head of an occupant can result in severe concussion.

SUMMARY

It is a main object of the present invention to provide a thin toughened sheet of glass for use in a laminated glass windscreen, which toughened glass sheet has such a stress condition that both the glass sheet and the laminated unit embodying the sheet have a dual fracture characteristic.

The desired dual fracture characteristic of a laminated windscreen is that the outer sheet of the laminate, when struck by a sharp object, for example a flying stone, fractures as single cracks or into very large pieces so that vision is not obscured; and when the inner sheet is struck by a human head, it fragments into a very large number of small particles. In order to provide this dual fracture characteristic of a windscreen in accordance with the invention the inner sheet is a toughened glass sheet and the outer sheet may be a toughened sheet or an annealed or slightly stressed sheet of glass.

The present invention employs the concept that any toughened glass sheet in a laminated windscreen should itself have a dual fracture characteristic so that it does not shatter into dice when struck by a sharp object but does shatter into a powdery fragmentation when struck by a blunt object such as a human head.

According to the invention a method of producing a toughened glass sheet of thickness in the range 1.8 mm to 4 mm having a dual fracture characteristic, comprises heating a sheet of glass to a temperature near to its softening point, exposing the surface of the hot glass sheet to gaseous chilling medium and maintaining against the glass surface a rate of flow of the gaseous chilling medium dependent on the glass thickness, which rate is just sufficient to give a selected heat transfer coefficient with respect to the glass in the range bounded by from 0.008 to 0.02 calories. $cm^{-2}$. $°C^{-1}$. $sec^{-1}$ for 1.8 mm glass and from 0.006 to 0.009 calories. $cm^{-2}$. $°C^{-1}$. $sec^{-1}$ for 4 mm glass.

The invention also includes a method of producing a toughened glass sheet of thickness in the range 1.8 mm to 4 mm having a dual fracture characteristic, comprising heating a sheet of glass to a temperature near to its softening point, exposing the surface of the hot glass sheet to gaseous chilling medium, and maintaining against the glass surface a rate of flow of the gaseous chilling medium dependent on the glass thickness, which rate is just sufficient to give a selected heat transfer coefficient with respect to the glass in the range bounded by from 0.008 to 0.02 calories. $cm^{-2}$. $°C^{-1}$. $sec^{-1}$ for 1.8 mm glass reducing to from 0.006 to 0.009 calories. $cm^{-2}$. $°C^{-1}$. $sec^{-1}$ for 4 mm glass, thereby producing in the glass a central tensile stress of from 260 $kg/cm^2$ to 470 $kg/cm^2$ for 1.8 mm glass reducing to from 210 $kg/cm^2$ to 330 $kg/cm^2$ for 4 mm glass.

Said range of selected heat transfer coefficient may be from 0.0077 to 0.0135 calories. $cm^{-2}$. $°C^{-1}$. $sec^{-1}$ for 3 mm glass.

The invention further includes a method of producing a laminated glass unit, comprising toughening a first glass sheet of thickness in the range 1.8 mm to 4 mm to induce in the glass a dual fracture characteristic, said toughening step being achieved by heating a sheet of glass to a temperature near to its softening point, exposing the surface of the hot glass sheet to gaseous chilling medium and maintaining against the glass surface a rate of flow of the gaseous chilling medium dependent on the glass thickness, which rate is just sufficient to give a selected heat transfer coefficient with respect to the glass in the range bounded by from 0.008 to 0.02 calories. $cm^{-2}$. $°C^{-1}$. $sec^{-1}$ for 1.8 mm glass and from 0.006 to 0.009 calories. $cm^{-2}$. $°C^{-1}$. $sec^{-1}$ for 4 mm glass, and bonding said toughened first glass sheet to a second glass sheet with an interlayer of transparent plastics material.

The invention still further includes a sheet of glass of thickness in the range 1.8 mm to 4 mm and toughened by contact with a gaseous chilling medium to give a dual fracture characteristic defined by a value of central tensile stress in the range bounded by from 260 $kg/cm^2$ to 470 $kg/cm^2$ for glass 1.8 mm thick and from 210 $kg/cm^2$ to 330 $kg/cm^2$ for glass 4 mm thick.

Said value of central tensile stress may be from 230 $kg/cm^2$ to 370 $kg/cm^2$ for glass 3 mm thick.

The invention also includes a laminated glass unit comprising a first glass sheet of thickness in the range 1.8 mm to 4 mm which sheet has been toughened by contact with a gaseous chilling medium to give a dual fracture characteristic defined by a value of central tensile stress bounded by from 260 $kg/cm^2$ to 470 $kg/cm^2$ for glass 1.8 mm thick and from 210 $kg/cm^2$ to 330 $kg/cm^2$ for glass 4 mm thick, and a second glass sheet bonded to said toughened first glass sheet with an interlayer of transparent plastics material.

Preferably the laminated glass unit is a vehicle windscreen and said first sheet of glass is the inner sheet of the windscreen.

BRIEF DESCRIPTION OF THE DRAWING

The drawing is a graph of central tensile stress plotted against glass thickness illustrating the main concept of the invention whereby a dual fracture characteristic of thin glass sheets can be represented in terms of a range of central tensile stress for each glass thickness.

DESCRIPTION OF THE PREFERRED EMBODIMENTS

For the toughening of glass sheets in accordance with the invention a sheet of soda-lime-silica glass is suspended vertically by tongs and is conveyed to a furnace where it is uniformly heated to a temperature near to its softening point, usually in the range 600° to 750° C. Preferably the temperature of the glass is not greater than 710° C. When a flat toughened sheet is to be produced the hot glass sheet is then quickly transferred to a position between a pair of quenching boxes or frames.

When a curved glass sheet is being produced the hot sheet of glass is quickly transferred to a position between a pair of horizontally operated complementary bending dies which close on to the sheet to bend the sheet to a required curvature. There may be some cooling of the glass during bending, for example by about 50° C, and some further cooling will occur during the rapid transfer of the curved glass sheet, still suspended by the same tong suspension, to a position between a pair of quenching boxes or frames.

In either case, the quenching boxes or frames are arranged to oscillate in known manner and they direct chilling gas, usually air, at ambient temperature from a series of nozzles in their opposed faces substantially uniformly over both of the major surfaces of the glass sheet.

As will be described below the pressure of the supply of chilling gas is regulated to produce a temperature differential through the thickness of the glass sheet which is such that when the glass sheet is cooled below its strain point to ambient temperature the toughening stresses which develop in the sheet impart to it a characteristic of dual fracture. The central tensile stress in the toughened sheet is within a range which is dependent on the thickness of the sheet and, as illustrated in the drawing, the upper and lower limits of the range of central tensile stress for the thinnest sheet, 1.8 mm thick, are higher than the limits of the range of central tensile stress for the thickest sheet, 4 mm thick. These limits and the reducing values of the limits with increasing thickness, as illustrated in the drawing define an area within which the central tensile stress in a toughened sheet of glass of thickness 1.8 mm to 4 mm has to lie if the toughened glass sheet is to exhibit the dual fracture characteristic.

The measurements of central tensile stress were made using an instrument developed by Triplex Safety Glass Company Limited which is employed to pass a beam of polarised light at a grazing angle into the principal surface of the glass sheet in such a manner that the beam emerges through the median of the peripheral edge surface of the sheet. The beam leaving the peripheral edge is analysed by a Babinet compensator and the central tensile stress in the glass sheet is then obtained by observing the slope of the fringes formed in the beam and comparing this slope with a previous calibration.

The characteristic of dual fracture is to some extent dependent on the use to which the glass sheet is put and cannot be numerically defined, being observed and assessed by the skilled operator performing fracture tests.

The invention, however, is capable of definition in terms of ranges of central tensile stress produced by quenching thin glass sheets with a chilling gas, there being a range of central tensile stress for each glass thickness in the range 1.8 mm to 4 mm which gives an acceptable dual fracture characteristics.

After the toughened glass sheet has cooled to room temperature, it is laminated with a second similarly toughened glass sheet or an annealed or slightly stressed sheet of glass using a penetration resistant interlayer of transparent plastics material, e.g., an interlayer of polyvinyl butyral 0.76 mm thick. Lamination is effected in known manner using a suitable combination of temperature and pressure, for example at 140° C and a pressure of 91 kg/cm$^2$.

Five examples for the toughening of glass sheets 1.8 mm thick to produce dual fracture characteristics in those sheets are set out below in Table I.

TABLE I

| Example No. | Glass thickness, mm. | Glass temperature, °C. | Pressure of chilling air, kg./cm.$^2$ | Heat transfer coefficient, calories·cm.$^{-2}$·°C.$^{-1}$·sec.$^{-1}$ | Quenching time, sec. | Central tensile stress, kg./cm.$^2$ | Stress ratio |
|---|---|---|---|---|---|---|---|
| 1 | 1.8 | 670 | 1.5 | 0.013 | 10 | 350 | 2.0:1 |
| 2 | 1.8 | 670 | 0.70 | 0.0086 | 10 | 280 | 2.0:1 |
| 3 | 1.8 | 670 | 3.8 | 0.017 | 10 | 420 | 2.0:1 |
| 4 | 1.8 | 670 | 4.8 | 0.018 | 10 | 440 | 2.0:1 |
| 5 | 1.8 | 670 | 6.5 | 0.019 | 10 | 460 | 2.0:1 |

In each of these Examples 1 to 5 the glass sheet was initially heated to 670° C. The quenching boxes had 1,550 orifices per square metre of the glass surface each orifice having a 1.6 mm bore. The orifices were arranged in a 25 mm square formation and spaced 50 mm from the glass surfaces. A quenching time of 10 seconds was employed in each of these Examples and the pressure of the chilling air was varied as set out in Table I.

The least toughened sheet was produced by Example 2 with a value of central tensile stress of 280 kg/cm$^2$ and the highest stress was Example 5 with a central tensile stress of 460 kg/cm$^2$. This range lies within the limits of the line AC in the Figure and this range of central tensile stress was produced by an effective range of heat transfer coefficient with respect to the glass of from 0.0086 to 0.019 calories. cm$^{-2}$. ° C$^{-1}$. sec$^{-1}$.

The ratio of surface compressive stress to central tensile stress for each of the toughened sheets was 2:1.

A series of experiments were then conducted for toughening glass sheets 3 mm thick and the results are set out in Table II.

TABLE II

| Example No. | Glass thickness, mm. | Glass temperature, °C. | Pressure of chilling air, kg./cm.² | Heat transfer coefficient, calories·cm.⁻². °C.⁻¹·sec.⁻¹ | Quenching time, sec. | Central tensile stress, kg./cm.² | Stress ratio |
|---|---|---|---|---|---|---|---|
| 6 | 3 | 650 | 0.045 | 0.011 | 10 | 320 | 2.2:1 |
| 7 | 3 | 650 | 0.020 | 0.0083 | 10 | 240 | 2.2:1 |
| 8 | 3 | 650 | 0.063 | 0.013 | 10 | 360 | 2.2:1 |

In each of these Examples 6 to 8 the glass sheet was heated to 650° C and then bent between a pair of complementary bending dies to give the desired curvature for a vehicle windscreen. The transferring of the sheet from the furnace to the bending dies, the bending and the subsequent transferring to a location between the quenching boxes involved a period of about 10 seconds so that by the time the glass reached the quenching boxes its surfaces had cooled to about 600° C.

The quenching boxes had a plurality of nozzles of 4.8 mm bore, there being 3,540 nozzles per square metre of the glass surface. The nozzles were spaced 3 mm from the adjacent glass surfaces and the pressure of air flow from the nozzles was adjusted in the range 0.02 to 0.063 kg/cm². This gave a range of effective heat transfer coefficient with respect to the glass of from 0.0083 to 0.013 calories. cm.⁻². °C.⁻¹. sec.⁻¹. The glass sheet was held between the quenching boxes for 10 seconds. Under these conditions the range of central tensile stress produced was from 240 kg/cm² to 360 kg/cm² and this range lies within the limits of the line GH in the Figure. The ratio of surface compressive stress to central tensile stress was 2.2:1 in each sheet and each of the 3 mm sheets produced exhibited dual fracture characteristics.

Table III illustrates four further experiments conducted with glass sheets 4 mm thick.

TABLE III

| Example No. | Glass thickness, mm. | Glass temperature, °C. | Pressure of chilling air, kg./cm.² | Heat transfer coefficient, calories·cm.⁻². °C.⁻¹·sec.⁻¹ | Quenching time, sec. | Central tensile stress, kg./cm.² | Stress ratio |
|---|---|---|---|---|---|---|---|
| 9 | 4 | 680 | 0.42 | 0.0082 | 120 | 280 | 2.1:1 |
| 10 | 4 | 680 | 0.28 | 0.0072 | 120 | 250 | 2.1:1 |
| 11 | 4 | 680 | 0.52 | 0.0087 | 120 | 310 | 2.1:1 |
| 12 | 4 | 680 | 0.24 | 0.0066 | 120 | 220 | 2.1:1 |

Each glass sheet was heated to 680° C and was quenched between a pair of blowing frames which consists of a series of perforated tubes. The orifices in the tubes were each of 1.8 mm bore and were so positioned that they formed a square formation measuring 44.5 mm × 44.5 mm. The tubes were positioned at a distance of 44.5 mm from each major surface of the glass sheet and air at ambient temperature was supplied by the orifices at a pressure from 0.25 kg/cm² to 0.52 kg/cm². This gave a range of effective heat transfer coefficient with respect to the glass of from 0.0066 to 0.0087 calories. cm.⁻². °C.⁻¹. sec.⁻¹. Each glass sheet was positioned between the blowing frames for two minutes. The range of central tensile stress produced in the glass was from 220 kg/cm² to 310 kg/cm² and the ratio of surface compressive stress to central tensile stress for each sheet was 2.1:1. Each sheet of glass had effective dual fracture characteristics lying within the limits of the limits of the line FD of the Figure.

The extreme limits of the area A B C D E F of the Figure represent the limits which have been found for values of central tensile stress to be induced in a sheet of glass of thickness 1.8 mm to 4 mm by an air toughening process to give the glass an acceptable dual fracture characteristic. These limits of central tensile stress are 260 kg/cm² to 470 kg/cm² for 1.8 mm glass (line AC), 230 kg/cm² to 370 kg/cm² for 3 mm glass (line GH), and 210 kg/cm² to 330 kg/cm² for 4 mm glass (line FD). To produce toughened glass sheets within these limits of central tensile stress, the corresponding limits for the heat transfer coefficient with respect to the glass are 0.008 to 0.02 calories. cm.⁻². °C.⁻¹. sec.⁻¹ for 1.8 mm glass, 0.0077 to 0.0135 calories. cm.⁻². °C.⁻¹. sec.⁻¹ for 3 mm glass, and 0.006 to 0.009 calories. cm.⁻². °C.⁻¹. sec.⁻¹ for 4 mm glass. Many other toughened glass sheets within the ranges illustrated were tested and all had acceptable dual fracture characteristics.

It will be seen from the drawing that in order to have an acceptable dual fracture characteristic higher central tensile stress is necessary in the thinner glass sheets. It has been found that preferred ranges for dual fracture characteristics lie within the upper region of the area A B C D E F, that is in the region A B E F so that for glass 1.8 mm thick the preferred range of central tensile stress is from 385 kg/cm² to 470 kg/cm² while at the other end of the thickness range the preferred central tensile stress in 4 mm glass is in the range 275 kg/cm² to 330 kg/cm². The preferred range of central tensile stress in 3 mm glass is 315 kg/cm² to 370 kg/cm². The corresponding preferred limits for the heat transfer coefficient with respect to the glass are 0.015 to 0.02 calories. cm.⁻². °C.⁻¹. sec.⁻¹ for 1.8 mm glass, 0.0107 to 0.0135 calories. cm.⁻². °C.⁻¹. sec.⁻¹ for 3 mm glass, and 0.008 to 0.009 calories. cm.⁻². °C.⁻¹. sec.⁻¹ for 4 mm glass.

In producing a laminated unit, for example a vehicle windscreen, the inner sheet of glass is a sheet toughened by the method of the invention and the outer sheet may be a similar sheet or may be an annealed sheet or a sheet having a very slight stress, for example a central tensile stress of up to 70 kg/cm² and preferably from 35 kg/cm² to 40 kg/cm², which is such that dicing fracture is not produced when the outer sheet is struck by a sharp object. Both sheets of the laminate may be of the same thickness, for example 3 mm, but a laminated unit may be constructed with sheets of different thicknesses, for example an inner sheet of 1.8 mm thickness and an outer sheet of 4 mm thickness. Preferably the overall glass thickness for the laminate for a vehicle windscreen is approximately 6 mm.

The arrangement of the quenching boxes and the pressure of the chilling air referred to in the Examples may be varied within the limits of the ranges of heat transfer coefficient specified above. This could be done by employing a different nozzle configuration with an accompanying change in the rate of air flow.

We claim:

1. A method of producing a toughened glass sheet of thickness in the range 1.8 mm to 4 mm having a dual fracture characteristic, comprising heating a sheet of glass to a temperature in the range 600° to 750° C, exposing the surface of the hot glass sheet to chilling gas and maintaining against the glass surface a flow of the chilling gas dependent on the glass thickness to determine a selected heat transfer coefficient with respect to the glass in the range bounded by from 0.008 to 0.02 calories. $cm^{-2}$. $°C^{-1}$. $sec^{-1}$ for 1.8 mm glass and from 0.006 to 0.009 calories. $cm^{-2}$. $°C^{-1}$. $sec^{-1}$ for 4 mm glass.

2. A method of producing a toughened glass sheet of thickness in the range 1.8 mm to 4 mm having a dual fracture characteristic, comprising heating a sheet of glass to a temperature in the range 600° to 750° C, exposing the surface of the hot glass sheet to chilling gas, and maintaining against the glass surface a flow of the chilling gas dependent on the glass thickness to determine a selected heat transfer coefficient with respect to the glass in the range bounded by from 0.008 to 0.02 calories. $cm^{-2}$. $°C^{-1}$. $sec^{-1}$ for 1.8 mm glass reducing to from 0.006 to 0.009 calories. $cm^{-2}$. $°C^{-1}$. $sec^{-1}$ for 4 mm glass, thereby producing in the glass a central tensile stress of from 260 $kg/cm^2$ to 470 $kg/cm^2$ for 1.8 mm glass reducing to from 210 $kg/cm^2$ to 330 $kg/cm^2$ for 4 mm glass.

3. A method according to claim 2, comprising adjusting the rate of flow of the chilling gas to give a heat transfer coefficient of from 0.015 to 0.020 calories. $cm^{-2}$. $°C^{-1}$. $sec^{-1}$ for 1.8 mm glass reducing to from 0.008 to 0.009 calories. $cm^{-2}$. $°C^{-1}$. $sec^{-1}$ for 4 mm glass, thereby producing in the glass a central tensile stress of from 385 $kg/cm^2$ to 470 $kg/cm^2$ for 1.8 mm glass reducing to from 275 $kg/cm^2$ to 330 $kg/cm^2$ for 4 mm glass.

4. A method according to claim 1, wherein said range of selected heat transfer coefficient is from 0.0077 to 0.0135 calories. $cm^{-2}$. $°C^{-1}$. $sec^{-1}$ for 3 mm glass.

5. A method according to claim 1, wherein said range of selected heat transfer coefficient is from 0.0077 to 0.0135 calories. $cm^{-2}$. $°C^{-1}$. $sec^{-1}$ for 3 mm glass, thereby producing in the glass a central tensile stress of 230 $kg/cm^2$ to 370 $kg/cm^2$.

6. A method according to claim 5, comprising adjusting the rate of flow of the chilling gas to give a heat transfer coefficient of from 0.0107 to 0.0135 calories. $cm^{-2}$. $°C^{-1}$. $sec^{-1}$ for 3 mm glass, thereby producing in the glass a central tensile stress of from 315 $kg/cm^2$ to 370 $kg/cm^2$.

7. A method of producing a toughened glass sheet of thickness in the range 1.8 mm to 4 mm having a central tensile stress lying within a range, relative to the thickness, such that the glass sheet exhibits a dual fracture characteristic in which the sheet when struck by a sharp object with sufficient force the sheet will fracture into very large pieces and when struck by a human head with sufficient force the sheet will fragment into a very large number of small particles, which method comprises the steps of:

a. heating a glass sheet having a selected thickness within the aforesaid range to a temperature within the range of 600° to 750° C for conditioning the glass sheet to attain, upon subsequent quenching a particular central tensile stress lying within that range which will impart said dual fracture characteristic to the glass sheet; and then b. quenching said glass sheet as conditioned in step (a) for imparting said particular central tensile stress to said sheet;

the quenching of step (b) being effected by directing air at ambient temperature against the major surfaces of said glass sheet at flow rates sufficient to give a selected heat transfer coefficient with respect to the glass in the range bounded by from 0.008 to 0.02 calories per square centimeter per second per degree centigrade for 1.8 mm glass to from 0.006 to 0.009 calories per square centimeter per second per degree centigrade for 4 mm glass, and said particular central tensile stress being in the range bounded by from 260 to 470 kilograms per square centimeter for 1.8 mm glass to from 210 to 330 kilograms per square centimeter for 4.0 mm glass.

8. The method according to claim 7 wherein said selected thickness is 1.8 mm, the glass sheet is heated to a temperature of 670° C, the chilling air is directed against the glass sheet at a pressure of from 1.5 to 6.5 $kg/cm^2$, the value of said heat transfer coefficient is from 0.013 to 0.019, the glass sheet is quenched for ten seconds and said particular central tensile stress is from 350 to 460 $kg/cm^2$.

9. The method according to claim 7 wherein said selected thickness is 3 mm, the glass sheet is heated to a temperature of 650° C, the chilling air is directed against the glass sheet at a pressure of from 0.045 to 0.063 $kg/cm^2$, the value of said heat transfer coefficient is from 0.011 to 0.013, the glass sheet is quenched for 10 seconds and said particular central tensile stress is from 320 to 360 $kg/cm^2$.

10. The method according to claim 7 wherein said selected thickness is 4 mm, the glass sheet is heated to a temperature of 680° C, the chilling air is directed against the glass sheet at a pressure of from 0.24 to 0.42 $kg/cm^2$, the value of said heat transfer coefficient is from 0.0066 to 0.0087, the glass sheet is quenched for 120 seconds and said particular central tensile stress is from 220 to 310 $kg/cm^2$.

11. A method of producing a toughened glass sheet having a value of central tensile stress related to its thickness and a ratio of surface compressive stress to central tensile stress which impart a dual fracture characteristic to the glass sheet, which dual fracture characteristic consists of the ability of the glass sheet to fracture into very large pieces when struck with sufficient force by a sharp object and to fracture into a very large number of small particles when struck with sufficient force by a human head, which method comprises the steps of:

a. heating a glass sheet of selected thickness in the range of 1.8 to 4.0 mm to a temperature within the range of 600° to 750° C for conditioning the glass sheet to achieve, upon subsequent quenching, said dual fracture characteristic; and then b. directing chilling air at ambient temperature against the major surfaces of the glass sheet and for a time sufficient to quench said glass sheet and attain a particular central tensile stress and a particular ratio of surface compressive stress to central tensile stress which imparts said dual fracture characteristic thereto;

said chilling air of step (*b*) establishing a heat transfer coefficient related to said particular thickness of the glass sheet in which the value of the coefficient is bounded from 0.008 to 0.02 calories per square centimeter per second per degree centigrade for 1.8 mm glass to from 0.006 to 0.009 calories per square centimeter per second per degree centigrade for 4 mm glass; said particular ratio of surface compressive stress to central tensile stress being in the order of 2:1; and said particular central tensile stress being in the range bounded by from 260 to 470 kg/cm$^2$ for 1.8 mm glass to from 210 to 330 kg/cm$^2$ for 4 mm glass.

12. The method according to claim 11 wherein said selected thickness is 1.8 mm, the glass sheet is heated to a temperature of 670° C, the chilling air is directed against the glass sheet at a pressure of from 1.5 to 6.5 kg/cm$^2$, the value of said heat transfer coefficient is from 0.013 to 0.019, the glass sheet is quenched for ten seconds and said particular central tensile stress is from 350 to 460 kg/cm$^2$.

13. The method according to claim 11 wherein said selected thickness is 3 mm, the glass sheet is heated to a temperature of 650° C, the chilling air is directed against the glass sheet at a pressure of from 0.045 to 0.063 kg/cm$^2$, the value of said heat transfer coefficient is from 0.011 to 0.013, the glass sheet is quenched for ten seconds and said particular central tensile stress is from 320 to 360 kg/cm$^2$.

14. The method according to claim 11 wherein said selected thickness is 4 mm, the glass sheet is heated to a temperature of 680° C, the chilling air is directed against the glass sheet at a pressure of from 0.24 to 0.42 kg/cm$^2$, the value of said heat transfer coefficient is from 0.0066 to 0.0087, the glass sheet is quenched for 120 seconds and said particular central tensile stress is from 220 to 310 kg/cm$^2$.

* * * * *